(12) United States Patent
Nakano

(10) Patent No.: US 9,216,717 B2
(45) Date of Patent: Dec. 22, 2015

(54) WIPER CONTROL DEVICE

(75) Inventor: Hiroyuki Nakano, Kosai (JP)

(73) Assignee: Asmo Co. Ltd., Shizuoka-Ken (JP)

( * ) Notice: Subject to any disclaimer, the term of this patent is extended or adjusted under 35 U.S.C. 154(b) by 6 days.

(21) Appl. No.: 13/823,264

(22) PCT Filed: Aug. 31, 2012

(86) PCT No.: PCT/JP2012/072149
§ 371 (c)(1),
(2), (4) Date: Mar. 14, 2013

(87) PCT Pub. No.: WO2013/038924
PCT Pub. Date: Mar. 21, 2013

(65) Prior Publication Data
US 2014/0142814 A1    May 22, 2014

(30) Foreign Application Priority Data
Sep. 15, 2011    (JP) .................................. 2011-202130

(51) Int. Cl.
*B60S 1/08*    (2006.01)

(52) U.S. Cl.
CPC . *B60S 1/0896* (2013.01); *B60S 1/08* (2013.01)

(58) Field of Classification Search
CPC .................................. B60R 16/02; B60S 1/08
USPC ........................................... 701/22; 903/930
See application file for complete search history.

(56) References Cited

U.S. PATENT DOCUMENTS 6,664,771 B2 * 12/2003 Scoggins ................ H02P 13/06
                                                              323/257
2002/0034086 A1    3/2002 Scoggins et al.
2011/0093151 A1    4/2011 Kojima et al.

FOREIGN PATENT DOCUMENTS

| EP | 2524844 A1 * | 11/2012 | ............ B60S 1/0859 |
|---|---|---|---|
| EP | 2524844 A1 * | 11/2012 | ................ B60S 1/08 |
| JP | 2001-12270 A | 1/2001 | |
| JP | 2003-165419 A | 6/2003 | |
| JP | 2004-203093 A | 7/2004 | |
| JP | 2005-231590 A | 9/2005 | |
| JP | 2010-006296 A | 1/2010 | |

* cited by examiner

*Primary Examiner* — Thomas G Black
*Assistant Examiner* — Ana Thomas
(74) *Attorney, Agent, or Firm* — Christensen Fonder PA

(57) ABSTRACT

A wiper control device controls a drive section for driving a wiper to operate at a target speed, thereby causing the wiper to perform wiping operation. The wiper control device includes a voltage monitoring section, which monitors a power source voltage supplied to the drive section, and a target speed setting section, which sets the target speed. When the power source voltage is lower than or equal to a threshold voltage, the target speed setting section sets the target speed in accordance with the power source voltage. When the power source voltage is higher than the threshold voltage, the target speed setting section sets the target speed at a constant value.

6 Claims, 4 Drawing Sheets

WIPER CONTROL DEVICE

RELATED APPLICATIONS

The present application is a National Phase entry of PCT Application No. PCT/JP2012/072149, filed Aug. 31, 2012, which claims priority from Japanese Patent Application No. 2011-202130, filed Sep. 15, 2011, the disclosures of which are hereby incorporated by reference herein in their entirety.

FIELD OF THE INVENTION

The present invention relates to a wiper control device that controls operation of wipers.

BACKGROUND OF THE INVENTION

As has been known, vehicles are equipped with wipers that wipe water droplets and the like off a window glass through repetitive reversal motions (for example, refer to Patent Document 1). The drive source for wipers is a wiper motor such as a reversing wiper motor. The wipers are operated by the wiper motor to perform reversal motions, while wiping the surface of a window glass. A wiper control device for controlling operation of a wiper motor controls the wiper motor such that the wiper motor rotates at a constant speed, that is, the rotational speed of the wiper motor is constant, even if the voltage of a vehicle battery changes in a predetermined range (for example, from 10 to 16 V). Such operation is performed both in an internal combustion engine vehicle and an electrically driven vehicle (a hybrid car and an electric vehicle).

PRIOR ART DOCUMENT

Patent Document

Patent Document 1: Japanese Laid-Open Patent Publication No. 2001-12270

SUMMARY OF THE INVENTION

In the configuration as described above, even when the voltage of a vehicle battery is lowered in a hybrid car or an electric vehicle, the rotational speed of a wiper motor is controlled to be constant so that the rotational speed of the wiper motor does not drop. Therefore, in a system that controls a wiper motor to maintain a constant rotational speed, a great amount of electricity of the battery is consumed by the wiper motor even if the remaining battery level is low. This may reduce the travel distance in a case of a hybrid car and deteriorate the fuel efficiency in a case of an electric vehicle.

In a case of an internal combustion engine vehicle, control for maintaining the rotational speed of the wiper motor brings about an advantage that the constant rotational speed of the motor improves the comfort regarding the wiper operation. On the other hand, in a case of an electrically driven vehicle, a constant motor speed can lead to reduction in the travel distance and the fuel efficiency. Under present circumstances, the types of needs for the control system for wiper motors vary in accordance with the type of vehicles.

To solve the problem, a wiper motor may be used without performing speed control. In that case, however, although the rotational speed of the wipers is reduced when the voltage of the vehicle battery is lowered, the rotational speed is increased when the battery voltage is raised. Such a configuration is not effective because the electricity of the vehicle battery can be consumed more than necessary, and wipers that are operated at a high speed by the wiper motor rotating at a high speed can spatter wiped water droplets.

Accordingly, it is an objective of the present invention to provide a wiper control device that reduces electricity required for operating wipers.

To achieve the foregoing objective and in accordance with one aspect of the present invention, a wiper control device is provided, which controls a drive section for driving a wiper to operate at a target speed, thereby causing the wiper to perform wiping operation. The wiper control device includes a voltage monitoring section, which monitors a power source voltage supplied to the drive section, and a target speed setting section. When the power source voltage is lower than or equal to a threshold voltage, the target speed setting section sets the target speed in accordance with the power source voltage. When the power source voltage is higher than the threshold voltage, the target speed setting section sets the target speed at a constant value.

DETAILED DESCRIPTION OF THE PREFERRED EMBODIMENTS

First Embodiment

A wiper control device according to a first embodiment of the present invention will now be described with reference to FIGS. 1 to 4.

Figure 1:
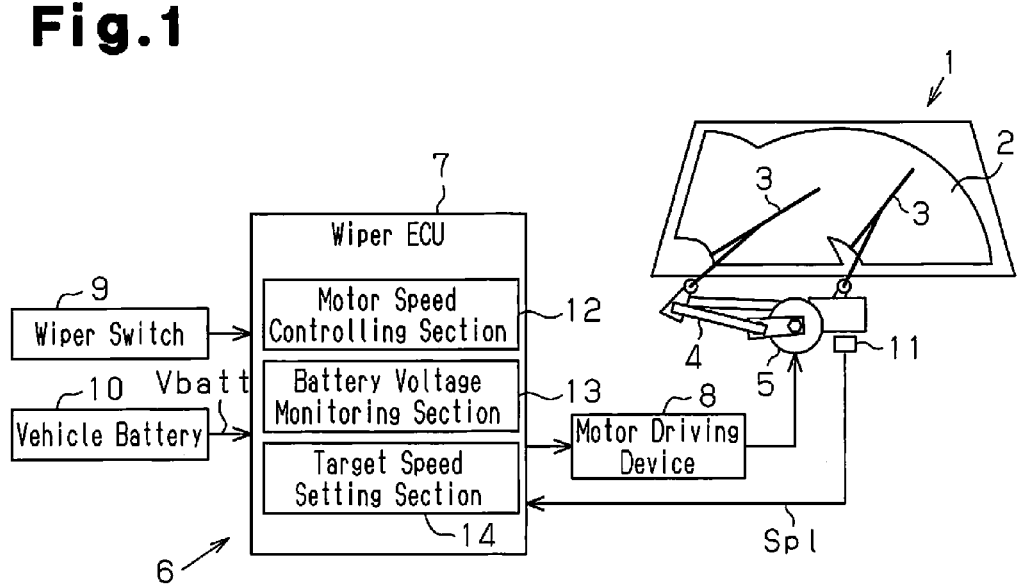
FIG. 1 is a diagram showing a wiper control device according to a first embodiment of the present invention.

As shown in FIG. 1, a vehicle 1 includes a window glass 2 and a pair of wipers 3, which wipe water droplets off the window glass 2 through repetitive reversal motions. The wipers 3 are connected to a wiper motor 5, which is, for example, a DC motor, via a conversion mechanism 4. The conversion mechanism 4 converts rotation of the wiper motor 5 into the repetitive reversal motions of the wipers 3. The wiper motor 5 corresponds to a drive section.

The vehicle 1 further includes a wiper control device 6, which controls operation of the wiper motor 5. The wiper control device 6 includes a wiper electronic control unit (wiper ECU) 7, which controls the wiper control device 6 in an integral manner, and a motor driving device 8, which supplies electricity to the wiper motor 5 based on commands from the wiper ECU 7. The wiper ECU 7 is connected to a wiper switch 9. Through manipulation of the wiper switch 9, the wipers 3 are turned on and off, and the operation mode of the wipers 3 can be switched.

A vehicle battery 10, which is a power source for various types of on-vehicle devices, is mounted on the vehicle 1. In a case in which the vehicle 1 is an electrically driven vehicle (a hybrid vehicle, an electric vehicle, or the like), the vehicle battery 10 also functions as the power source for a motor (not shown) that drives wheels. Needless to say, the vehicle battery 10 also functions as the power source for the wiper control device 6.

The wiper motor 5 has a rotational speed sensor 11 for detecting the rotational speed of the wiper motor 5. The rotational speed sensor 11 is, for example, a rotary encoder that is connected to the wiper ECU 7. The rotational speed sensor 11 outputs a motor speed signal Sp1, which indicates the rotational speed of the wiper motor 5, to the wiper motor 5.

The wiper ECU 7 has a motor speed controlling section 12, which controls the rotational speed of the wiper motor 5 to match with a target rotational speed, so that the number of wipes in a time period by the wipers 3 matches with a target number of wipes in a time period. The motor speed controlling section 12 obtains the current rotational speed (the actual rotational speed) of the wiper motor 5 based on the motor speed signal Sp1, which is output by the rotational speed sensor 11. Based on the difference between the actual rotational speed and the target rotational speed, the motor speed controlling section 12 controls the operation of the wiper motor 5 to perform feedback control, thereby repeating a process for causing the actual rotational speed to approach the target rotational speed. Accordingly, the wiper motor rotates such that the actual rotational speed follows the target rotational speed. The motor speed controlling section 12 corresponds to a speed controlling section, the target rotational speed corresponds to a target speed, and the actual rotational speed corresponds to a current speed.

The wiper control device 6 of the present embodiment has a wiper motor power saving function (hereinafter, referred to as a power saving function), in which the device 6 reduces the power consumption by the wiper motor 5 by switching the operation mode of the wiper motor 5 based on the voltage of the vehicle battery 10 (the battery voltage Vbatt). In the power saving function, when the battery voltage Vbatt is lower than or equal to a set voltage Vk, which is a threshold voltage, the wiper control device 6 controls the rotational speed of the wiper motor 5 (the number of wipes in a time period by the wipers 3) in accordance with the battery voltage Vbatt. Also, when the battery voltage Vbatt is higher than voltage Vk, the wiper control device 6 controls the wiper motor 5 such that the rotational speed of the wiper motor 5 (the number of wipes in a time period by the wipers 3) is maintained at a constant speed. The set voltage Vk is a reference voltage for determining whether the wiper ECU 7 should reduce the consumption of the electricity of the vehicle battery 10. When the battery voltage Vbatt is lower than or equal to the set voltage Vk, the wiper ECU 7 determines that the consumption of the electricity of the vehicle battery 10 needs to be reduced. The battery voltage Vbatt corresponds to a power source voltage.

The wiper ECU 7 has a battery voltage monitoring section 13, which monitors the battery voltage Vbatt. The battery voltage monitoring section 13 monitors the battery voltage Vbatt by capturing a voltage value via a harness (not shown) extending from the vehicle battery 10. The battery voltage monitoring section 13 starts monitoring the battery voltage Vbatt, for example, when the ignition switch (not shown) of the vehicle 1 is turned on.

Figure 2:
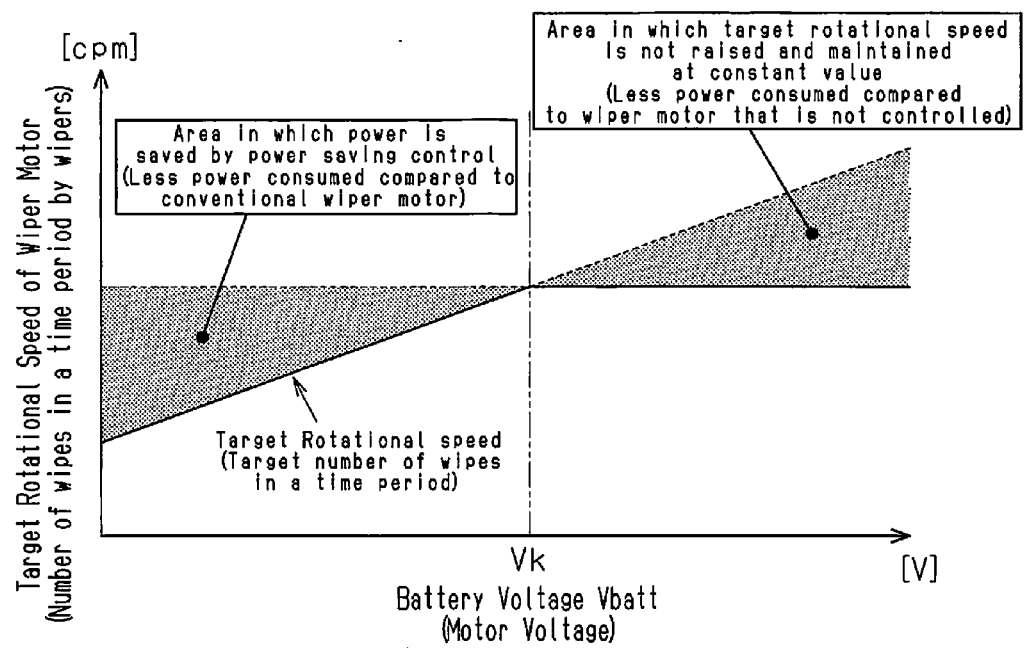
FIG. 2 is a diagram showing the relationship between a target rotational speed of the wiper motor shown in FIG. 1 and a battery voltage.

The wiper ECU 7 further includes a target speed setting section 14, which sets a target rotational speed used in the control of the rotational speed of the wiper motor 5. The target speed setting section 14 sets the target rotational speed in accordance with the battery voltage Vbatt obtained by the battery voltage monitoring section 13. As shown in FIG. 2, the target speed setting section 14 of the present embodiment sets the target rotational speed in accordance with the battery voltage Vbatt when the battery voltage Vbatt is lower than or equal to the set voltage Vk. The target speed setting section 14 sets the target rotational speed to a constant value when the battery voltage Vbatt is higher than the set voltage Vk. The target speed setting section 14 corresponds to a target speed setting section.

The motor speed controlling section 12 feedback controls the rotational speed of the wiper motor 5 by using, as a reference, the target rotational speed set by the target speed setting section 14. That is, when the battery voltage Vbatt is lower than or equal to the set voltage Vk, the motor speed controlling section 12 feedback controls the wiper motor 5 such that the actual rotational speed of the wiper motor 5 approaches a target rotational speed that is varied in accordance with the battery voltage Vbatt. When the battery voltage Vbatt is higher than the set voltage Vk, the motor speed controlling section feedback controls the wiper motor 5 such that the actual rotational speed of the wiper motor 5 approaches a target rotational speed that is the constant value.

Figure 3:
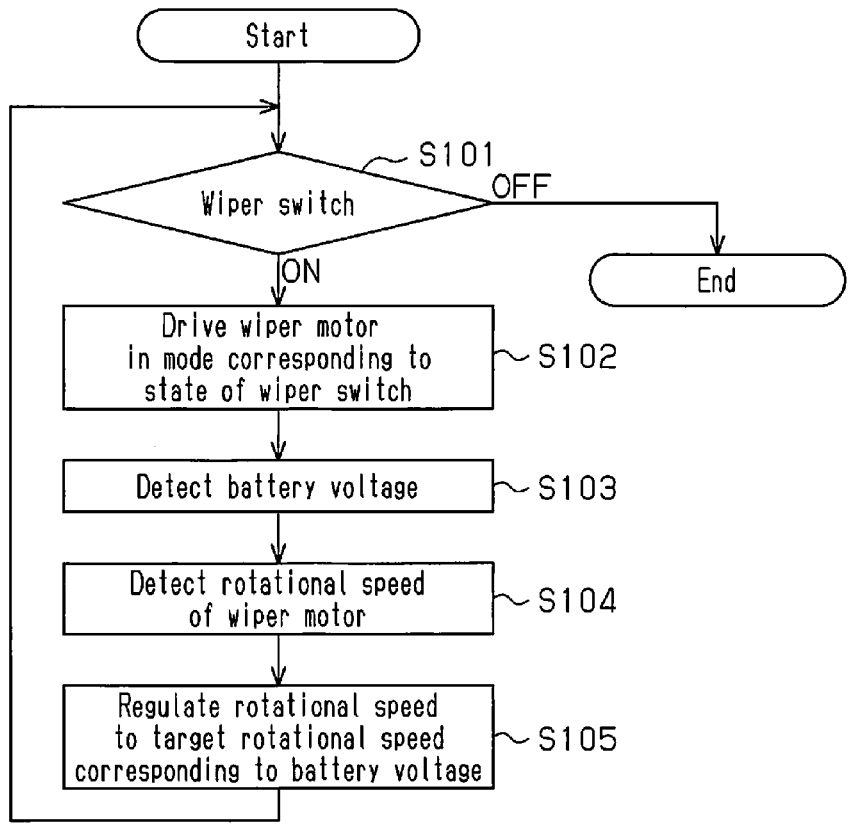
FIG. 3 is a flowchart showing operation of a power saving function of the wiper motor shown in FIG. 1.

Next, operation of the power saving function of the present embodiment will be described with reference to the flowchart of FIG. 3. The process represented by the flowchart of FIG. 3 is repeated while the ignition switch is ON.

At step 101, the wiper ECU 7 determines whether the wiper switch 9 is ON or OFF. If the wiper switch 9 is ON, the process goes to step 102. If the wiper switch 9 is OFF, the process is terminated.

At step 102, the wiper ECU 7 drives the wiper motor 5 in an operation mode that corresponds to the state of the wiper switch 9. Specifically, in accordance with the operation position of the wiper switch 9, the wiper ECU 7 starts wiping motion of the wipers 3 in a continuous mode, in which the wipers 3 move continuously, an intermittent mode, in which the wipers 3 are moved intermittently, and a mist mode, in which the wipers 3 are moved a predetermined number of times.

At step 103, the battery voltage monitoring section 13 detects the battery voltage Vbatt by monitoring the voltage of the vehicle battery 10. At this time, if the battery level of the vehicle battery 10 is decreasing, a low value of the battery voltage Vbatt is detected. If the battery level of the vehicle battery 10 is sufficient, a high value of the battery voltage Vbatt is detected. The target speed setting section 14 sets the target rotational speed in accordance with the battery voltage Vbatt at the time. If the battery voltage Vbatt is lower than or equal to the set voltage Vk, the target rotational speed is set in accordance with the battery voltage Vbatt at the time. If the battery voltage Vbatt is higher than the set voltage Vk, the target rotational speed is set to a constant value.

At step 104, the target speed setting section 14 obtains the motor speed signal Sp1 output from the rotational speed sensor 11. That is, the target speed setting section 14 obtains the current actual rotational speed of the wiper motor 5.

At step 105, based on the actual rotational speed obtained from the motor speed signal Sp1 output by the rotational speed sensor 11 and the target rotational speed set by the target speed setting section 14, the motor speed controlling section 12 feedback controls the wiper motor 5, thereby causing the rotational speed of the wiper motor 5 to approach the target rotational speed. Accordingly, the wipers 3 perform repetitive reversal motions at an optimum speed.

As described above, in the present embodiment, when the battery voltage Vbatt is lower than or equal to the set voltage Vk, the target rotational speed in the feedback control of the wiper motor 5 is set in accordance with the battery voltage Vbatt. Thus, the battery voltage Vbatt is prevented from being excessively consumed by the wiper motor 5 when the battery voltage Vbatt is low. This limits the power consumption by the wiper motor 5 when the battery voltage Vbatt is low, so that the travel distance and the fuel efficiency of the vehicle 1 are improved.

When the battery voltage Vbatt is higher than the set voltage Vk, the target rotational speed in the feedback control of the wiper motor 5 is set to a constant value. The target rotational speed is not increased more than necessary. Therefore, even when the battery voltage Vbatt is higher than the set voltage Vk, the battery voltage Vbatt is prevented from being wasted. Also, when the battery voltage Vbatt is higher than the set voltage Vk, the target rotational speed is not significantly increased, so that the wipers 3 are not operated at an overly increased speed. The wipers 3 are therefore prevented from spattering water droplets.

Figure 4:
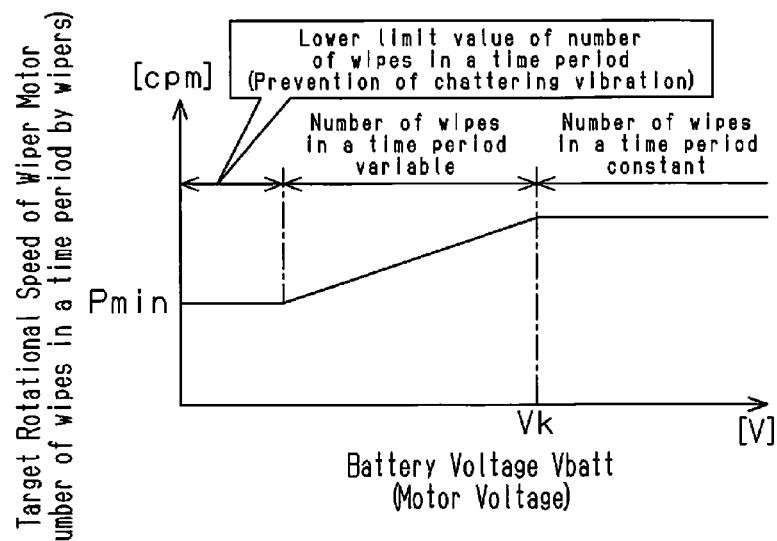
FIG. 4 is a diagram showing an example in which a lower limit value is set for the target rotational speed.

Further, as in a modification shown in FIG. 4 of the power saving function of the present embodiment, a lower limit value may be set for the target rotational speed of the wiper motor 5. That is, when the target rotational speed is lower than or equal to a lower limit value Pmin, the target rotational speed may be set to a constant value. Since this configuration ensures the minimum drive force for causing the wipers 3 to perform wiping, chattering vibration of the wipers 3 is suppressed.

The present embodiment provides the following advantages.

(1) When the battery voltage Vbatt is lower than or equal to the set voltage Vk, the motor speed controlling section 12 feedback controls the wiper motor 5 to rotate at a target rotational speed that corresponds to the battery voltage Vbatt. When the battery voltage Vbatt is higher than the set voltage Vk, the motor speed controlling section 12 feedback controls the wiper motor 5 to rotate at a constant target rotational speed. Therefore, when the battery voltage Vbatt is lower than or equal to the set voltage Vk (when the battery voltage Vbatt is decreasing), the electricity consumed by the wiper motor 5 is reduced. This allows the battery voltage Vbatt to be efficiently consumed. When the battery voltage Vbatt is higher than the set voltage Vk (when the battery voltage Vbatt is relatively high), the wiper motor 5 is not supplied with excessively high electricity. Accordingly, the electricity is not wasted.

(2) When the battery voltage Vbatt is higher than the set voltage Vk, the target rotational speed in the feedback control of the wiper motor 5 is set to a constant value. Thus, even if the battery voltage Vbatt is high, the voltage applied to the wiper motor 5 is limited to a constant value. Since the wipers 3 are not operated at an unnecessarily high speed, the wipers 3 do not spatter droplets of rain water.

(3) Since operation of the wiper motor 5 is feedback controlled, the wiper motor 5 is operated at an optimum speed in a stable manner.

(4) In the modification shown in FIG. 4, the lower limit value Pmin of the target rotational speed of the wiper motor 5 is set when the battery voltage Vbatt is lower than or equal to the set voltage Vk. In this case, even if the battery voltage Vbatt is significantly lowered, the minimum voltage applied to the wiper motor 5 is ensured. This reduces the likeliness of chattering vibration of the wipers 3.

Second Embodiment

A wiper control device according to a second embodiment will now be described with reference to FIGS. 5 to 8. The second embodiment is different from the first embodiment in that the wiper control device 6 can be operated in an eco mode, and other basic configurations are the same as the first embodiment. Therefore, the same reference numerals are given to those components that are the same as the corresponding components of the first embodiment, and the differences from the first embodiment will be described below.

Figure 5:
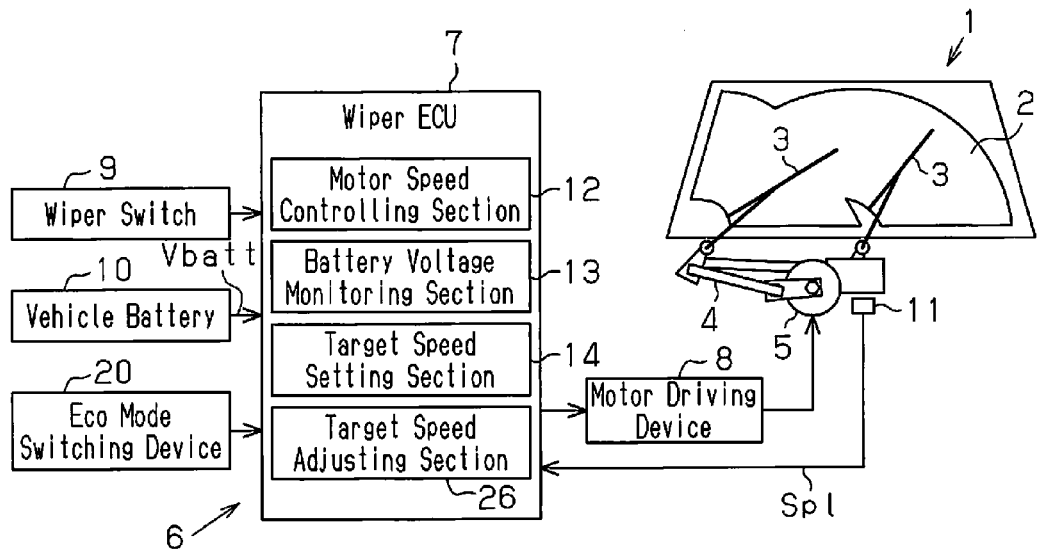
FIG. 5 is a diagram showing a wiper control device according to a second embodiment of the present invention.
Figure 6A:
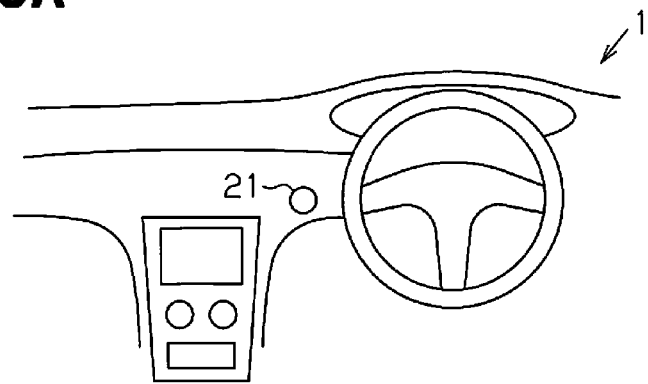
FIG. 6A is a schematic diagram showing an example of an eco mode switching device.

As shown in FIG. 5, the wiper ECU 7 includes an eco mode switching device 20, which functions as a power saving mode switching section. By manipulating the eco mode switching device 20, the operation mode of the wiper control device 6 is switched to an eco mode. In the eco mode, the wiper control device 6 operates the wiper motor 5 in an energy saving manner. One example of the eco mode switching device 20 is a mechanical eco mode switch 21 as shown in FIG. 6A, which is provided in the passenger compartment. The eco mode switch 21 includes, for example, a micro switch that can be pressed and turned. In this case, the eco mode is turned ON or OFF by pressing the eco mode switch 21, and the regulation amount of the target rotational speed is regulated by manually turning the eco mode switch 21. The eco mode corresponds to a power saving mode.

Figure 6B:
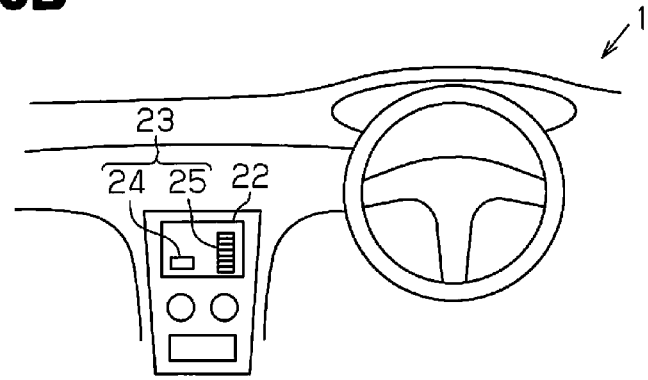
FIG. 6B is a schematic diagram showing another example of an eco mode switching device.

Another example of the eco mode switching device 20 is a touch control type display 22 of a navigation system as shown in FIG. 6B. In the case of the touch control type display 22, a touch control type eco mode switch 23 is displayed on the screen of the display 22 as an operational icon. The eco mode switch 23 includes an eco mode ON/OFF switch 24 and a target speed regulating switch 25. The eco mode switches 21, 23 correspond to regulating sections.

As shown in FIG. 5, the wiper ECU 7 includes a target speed adjusting section 26. The target speed adjusting section 26 adjusts the target rotational speed, which has been set in accordance with the battery voltage Vbatt, in accordance with the eco mode manipulation performed on the eco mode switching device 20. Specifically, when the eco mode is activated in the eco mode switching device 20, the target speed adjusting section 26 adjusts, based on the regulating amount of the target rotational speed, the target rotational speed, which has been determined by the target speed setting section 14 in accordance with the battery voltage Vbatt.

Figure 7:
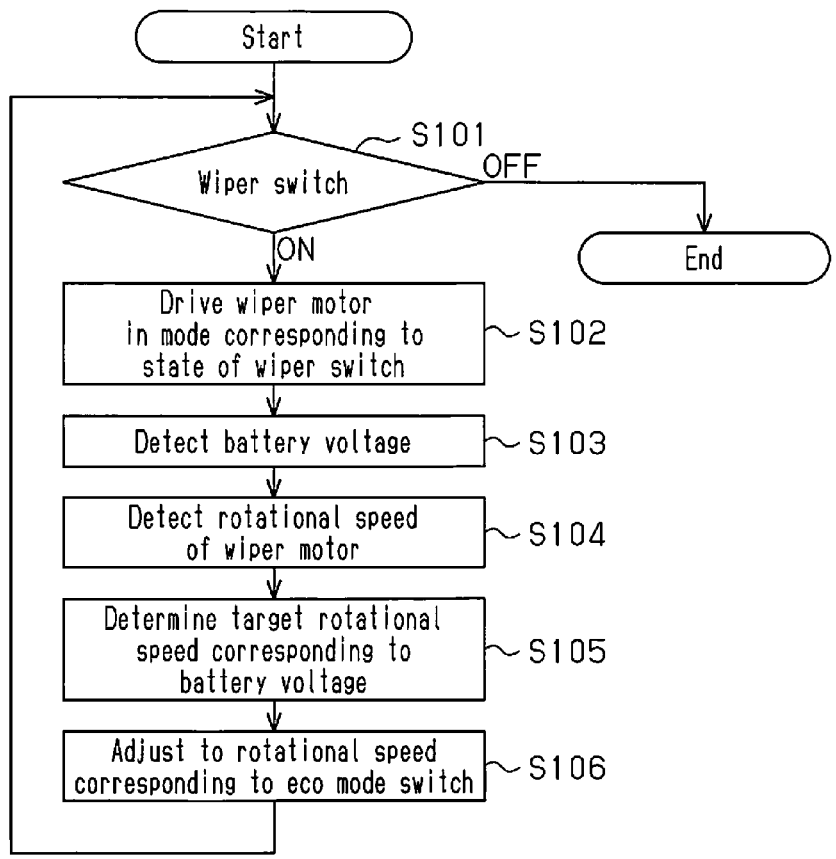
FIG. 7 is a flowchart showing operation of a power saving function of the wiper motor shown in FIG. 5.
Figure 8:
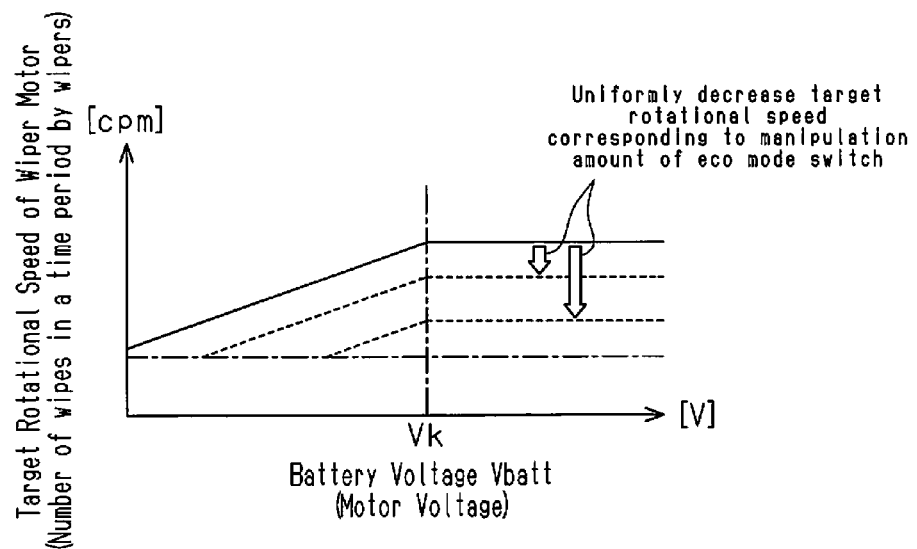
FIG. 8 is a diagram showing an example of operation when the eco mode is activated.

In the case of the power saving function of the present embodiment, at step 106, which is subsequent to step 105 as shown in FIG. 7, the target speed adjusting section 26 adjusts the target rotational speed, which has been set by the target speed setting section 14, to a rotational speed corresponding to manipulation of the eco mode switch 21, 23. That is, as shown in FIG. 8, the target speed adjusting section 26 wholly, or uniformly, decreases the target rotational speed, which has been set by the target speed setting section 14, by an amount set by the eco mode switch 21, 23. This reduces the electricity required for driving the wiper motor 5, so that the power of the vehicle battery 10 is saved.

The present embodiment provides the following advantages in addition to the advantages (1) to (4) of the first embodiment.

(5) The eco mode switching device 20 is connected to the wiper ECU 7. Through manipulation of the eco mode switching device 20, the operation mode of the wiper control device 6 is switched to the eco mode. The power consumption is therefore further reduced.

(6) Through manipulation of the eco mode switch 21, 23 of the eco mode switching device 20, the level of the eco mode (the target rotational speed in the eco mode) can be changed. This allows the level of the eco mode to be freely regulated to further reduce the power consumption.

The embodiments may be modified as follows.

In each embodiment, the target rotational speed does not necessarily have to be set to one value when the battery voltage Vbatt is higher than the set voltage Vk. For example, the target rotational speed when the battery voltage Vbatt is higher than the set voltage Vk may be set discretely.

In the second embodiment, the eco mode switching device 20 does not necessarily need to have the structure shown in FIG. 6A or 6B, but may have any other structure as necessary.

In the second embodiment, adjustment of the target rotational speed is not limited to uniform reduction of the rotational speed in relation to the battery voltage, but may be executed with a predetermined regularity.

In each embodiment, the power source voltage is not limited to the battery voltage Vbatt (the voltage of the vehicle battery 10). The power source voltage may be changed to any other power source as long as it is the power source of the wiper motor 5.

In each embodiment, the set voltage Vk is not limited to a fixed value, but may be a variable value. In this case, the set voltage Vk may be automatically changed in accordance with the state of the wiper control device 6 or manually changed with a switch.

In each embodiment, the wipers 3 do not necessarily need to perform reversal motions, but may perform other types of motions.

In each embodiment, the drive section is not limited to a motor, but may be other type of actuator.

In each embodiment, various types of sensors may be employed as the rotational speed sensor 11.

In each embodiment, a various types of control, such as PID control, may be executed as the feedback control.

In each embodiment, the speed control is not limited to feedback control, but may be, for example, sequential control.

In each embodiment, the wiper control device 6 is not limited to be mounted on an electrically driven vehicle, but may be mounted on an internal combustion engine vehicle.

The invention claimed is:

1. A wiper control device, which controls a wiper to operate at a target speed by adjusting electricity that is supplied to a drive section for driving the wiper to perform wiping operation, the wiper control device comprising:
    a voltage monitoring section, which monitors a power source voltage supplied to the drive section; and
    a target speed setting section which adjusts the electricity supplied to the drive section, wherein, when the power source voltage is lower than or equal to a threshold voltage, the target speed setting section decreases the target speed in accordance with the power source voltage, and wherein, when the power source voltage is higher than the threshold voltage, the target speed setting section sets the target speed at a constant value.

2. The wiper control device according to claim 1, further comprising a speed controlling section, wherein, based on a difference between a current speed of the wiper and the target speed, the speed controlling section feedback controls the drive section such that the current speed of the wiper follows the target speed.

3. The wiper control device according to claim 1, wherein, when the power source voltage is lower than or equal to the threshold voltage and the target speed is lower than or equal to a lower limit value, the target speed setting section sets the target speed to a constant value.

4. The wiper control device according to claim 1, further comprising a power saving mode switching section, which is capable of being manipulated to switch an operation mode of the wiper control device to a power saving mode,
    wherein, in the power saving mode, the target speed in relation to the power source voltage is uniformly lowered, thereby reducing electricity consumed by the drive section.

5. The wiper control device according to claim 4, wherein the power saving mode switching section includes a regulating section, and wherein, in the power saving mode, the regulating section allows the target speed to be manually regulated.

6. A wiper control device for a vehicle, which controls a wiper to operate at a target speed by adjusting an electricity that is supplied to a motor for driving the wiper to perform wiping operation on a surface of a window glass of the vehicle, the wiper control device comprising:
    a voltage monitoring section, which monitors a power source voltage supplied to the motor; and
    a target speed setting section which adjusts the electricity supplied to the motor, wherein, when the power source voltage is lower than or equal to a threshold voltage, the target speed setting section decreases the target speed in accordance with the power source voltage, and wherein, when the power source voltage is higher than the threshold voltage, the target speed setting section sets the target speed at a constant value.

* * * * *